United States Patent
Yu et al.

(10) Patent No.: US 12,370,591 B2
(45) Date of Patent: Jul. 29, 2025

(54) APPARATUS AND METHOD FOR EXTRUDING CURVED PROFILES

(71) Applicant: Imperial College Innovations Limited, London (GB)

(72) Inventors: Junquan Yu, London (GB); Wenbin Zhou, London (GB); Zhutao Shao, London (GB); Jianguo Lin, London (GB); Trevor Dean, London (GB)

(73) Assignee: Imperial College Innovations Limited, London (GB)

( * ) Notice: Subject to any disclaimer, the term of this patent is extended or adjusted under 35 U.S.C. 154(b) by 289 days.

(21) Appl. No.: 17/427,379

(22) PCT Filed: Jan. 30, 2020

(86) PCT No.: PCT/GB2020/050227
§ 371 (c)(1),
(2) Date: Jul. 30, 2021

(87) PCT Pub. No.: WO2020/157514
PCT Pub. Date: Aug. 6, 2020

(65) Prior Publication Data
US 2022/0126344 A1    Apr. 28, 2022

(30) Foreign Application Priority Data
Jan. 31, 2019    (GB) ...................................... 1901382

(51) Int. Cl.
*B21C 23/12*    (2006.01)
*B21C 25/08*    (2006.01)

(52) U.S. Cl.
CPC .............. *B21C 23/12* (2013.01); *B21C 25/08* (2013.01)

(58) Field of Classification Search
CPC ............................... B21C 23/12; B21C 25/08
(Continued)

(56) References Cited

U.S. PATENT DOCUMENTS

| | | | | |
|---|---|---|---|---|
| 368,314 A | * | 8/1887 | Whitney | ................. B21C 23/12 72/260 |
| 2,620,922 A | * | 12/1952 | Deutsch | ................. B21C 23/30 72/259 |

(Continued)

FOREIGN PATENT DOCUMENTS

| | | | |
|---|---|---|---|
| CN | 1837585 | * | 4/2006 |
| CN | 108620487 | * | 9/2018 |

(Continued)

OTHER PUBLICATIONS

First Examination Report received in India Patent Application No. 202117033437, dated Nov. 18, 2022, in 6 pages.

(Continued)

*Primary Examiner* — Christopher L Templeton
*Assistant Examiner* — P Derek Pressley
(74) *Attorney, Agent, or Firm* — Procopio, Cory, Hargreaves & Savitch LLP (57) ABSTRACT

Embodiments described herein relate to apparatus for extruding a material. The apparatus includes an extrusion die arranged to receive material to be extruded from a first direction and from a second direction. The extrusion die includes an orifice from which material is extruded in a third direction. The first, second and third directions are not all in the same plane. None of the first, second and third directions is parallel to any other of those directions.

13 Claims, 8 Drawing Sheets

(58) Field of Classification Search
USPC .......................................................... 72/256
See application file for complete search history.

(56) References Cited

U.S. PATENT DOCUMENTS

| | | | | | |
|---|---|---|---|---|---|
| 3,286,502 | A | * | 11/1966 | Cogan | ..................... B21C 23/16 |
| | | | | | 72/260 |
| 2004/0074275 | A1 | * | 4/2004 | Jin | ........................ B21C 35/00 |
| | | | | | 72/260 |

FOREIGN PATENT DOCUMENTS

| | | | | |
|---|---|---|---|---|
| JP | 2003019532 A | * | 1/2003 | ........... B21C 23/001 |
| SU | 837435 A1 | | 6/1981 | |
| WO | 2002036279 A1 | | 5/2002 | |
| WO | 2018206960 A1 | | 11/2018 | |

OTHER PUBLICATIONS

Search Report dated Jul. 12, 2019 from United Kingdom patent application No. GB1901382.0, 4 pages.
International Search Report and Written Opinion mailed on May 6, 2020 from International Application No. PCTGB2020/050227, 13 pages.
Notification of Reasons for Refusal received in Japan Patent Application No. 2021-544681, dated Sep. 5, 2023, in 6 pages, with translation.

* cited by examiner

APPARATUS AND METHOD FOR EXTRUDING CURVED PROFILES

CROSS-REFERENCE TO RELATED APPLICATIONS

This application is a U.S. National Stage entry of PCT Application No: PCT/GB2020/050227 filed Jan. 30, 2020, which claims priority to United Kingdom Patent Application No. 1901382.0 filed Jan. 31, 2019, the contents of which are incorporated herein by reference.

FIELD

Embodiments described herein relate to a method and apparatus for forming curved material profiles.

BACKGROUND

Reducing the weight of components used in land, sea and air travel leads to a reduction in fuel consumption and therefore a decrease in $CO_2$ emissions. Curved profiles are extensively used as construction elements in industrial manufacturing for the production of structures with a high contour complexity. For example, aluminium alloy profiles are used for the production of lightweight component structures such as seat rails, stringers, and frames in the aircraft industry as well as window frames and roof rails in the automotive industry.

Existing methods for curving material profiles usually start with the manufacture of straight profiles by shape rolling or extrusion. This is followed by a subsequent bending process, such as stretch bending, rotary draw bending, press bending, or roll bending (three-, four-, and six-roll-bending). However, these methods have the following disadvantages: (i) more than one process is needed to achieve profiles with the desired curvature, which decreases manufacturing productivity; (ii) spring-back and cross-sectional deformations can occur owing to the high external bending strain applied in the bending process; (iii) for hollow sections various fillers and mandrels are used in the secondary bending process to avoid the potential for cross-sectional deformation and buckling; (iv) owing to the high forces needed for bending profiles, heavy machines are required; and (v) many hollow profiles cannot be bent if the shell is too thin or the curvature is too severe.

Another existing method involves bending extruded profiles by using apparatus which is installed directly adjacent to the material exit from the extrusion machine. This method is also disadvantageous owing to the requirement for specialised and complex bending and guiding devices and also suffers from the problems (ii) to (v), described above. A further existing method involves obtaining a variation in the flow velocity of the extruded material over the cross-section of the extrusion orifice, by implementing features in the extrusion die. However, the complexity in obtaining the correct orifice design, together with the lack of ability to change the curvature of the extrudate unless the tooling is changed, limit the application of this method.

Methods of producing planar curved profiles exist. These methods involve the formation of profiles with variable curvature in one operation. However, the profiles produced by these methods are planar profiles (that is, the material is curved in one plane only). To produce a three-dimensional profile (that is, with the material having a curvature in two orthogonal directions), an additional operation is required. This additional operation may require the use of the existing methods described above, giving rise to similar disadvantages.

Accordingly, there is a need to improve the manufacture of curved material profiles.

SUMMARY

Aspects and features of the invention are set out in the appended claims.

According to one aspect the present disclosure, there is provided apparatus for extruding a material, the apparatus comprising an extrusion die arranged to receive material to be extruded from a first direction and from a second direction, the extrusion die comprising an orifice from which material is extruded in a third direction; wherein the first, second and third directions are not all in the same plane and wherein none of the first, second and third directions is parallel to any other of those directions.

Given that the first, second and third directions are not all in the same plane and that none of the first, second and third directions is parallel to any other of those directions, material is extruded from the orifice as a three-dimensional curved profile. That is, the extruded material is curved in two orthogonal directions. Providing material from the first direction contributes to the curvature of the extruded material in one of the two orthogonal directions, while providing material from the second direction contributes to the curvature of the extruded material in the other one of the two orthogonal directions.

The extrusion die may be arranged to receive material to be extruded from the first direction and from the second direction such that selectively providing material in the first direction allows the extruded material to be curved in the first direction and selectively providing material in the second direction allows the extruded material to be curved in the second direction. The extrusion die may be arranged to receive material to be extruded from the first direction and from the second direction such that selectively providing material in the first direction allows the curvature of the extruded material to be controlled in a first output direction and selectively providing material in the second direction allows the curvature of the extruded material to be controlled in a second output direction, wherein the first output direction and the second output direction are orthogonal. The first output direction may be orthogonal to the third direction. The second output direction may also be orthogonal to the third direction.

The first direction may be expressed as a three-dimensional vector having a first direction component, which is parallel to a first output direction. Similarly, the second direction may be expressed as a three-dimensional vector having a second direction component which is parallel to a second output direction, wherein the second direction component is orthogonal to the first direction component. The extrusion die may be arranged such that, when the first and second directions are each expressed as a three-dimensional vector, the first direction component causes the extruded material to be curved in the first output direction and the second direction component causes the extruded material to be curved in the second output direction. Each of the first direction component and the second direction component may therefore be large enough to cause the extruded material to be curved in the first output direction and the second output direction, respectively.

The first direction and the second direction may be expressed in Cartesian coordinates. The first direction may be expressed as a three-dimensional vector having a non-zero x-component, a y-component (which may be zero or non-zero) and a z-component which is equal to zero. The second direction may then be expressed as a three-dimensional vector having an x-component (which may be zero or non-zero), a y-component (which may be zero or non-zero) and a non-zero z-component. The third direction (i.e. the direction in which material is extruded from the orifice) may be aligned with a notional y-axis. In this case, the x-component of the first direction results in material extruded along the y-axis being curved towards a notional x-axis. Similarly, the z-component of the second direction results in material extruded along the y-axis being curved towards a notional z-axis. If the x-component of the second direction is non-zero, the x-component of the second direction is either cumulative with, or offsets, the curvature resulting from the x-component of the first direction (depending on the relative orientation of the first and second directions).

The first direction and the third direction may be substantially orthogonal. Increasing the angle between the first and third directions increases the amount of severe plastic deformation (SPD) that occurs in the extrusion die at the intersection point between the first and third directions. SPD of the material results in an extruded profile with ultra-fine grain size, thereby improving the mechanical properties of the extruded profile. Therefore, the substantially orthogonal arrangement increases the amount of SPD that occurs in the extrusion die and consequently gives rise to improved mechanical properties. Likewise, the second direction and the third direction may also be substantially orthogonal, which also gives rise to improved mechanical properties.

The first and second directions may be substantially orthogonal. The substantially orthogonal arrangement of the first and second directions provides for improved control of the extrusion process, because it provides increased control over the directions in which the extruded material is curved. To explain, providing material in the first direction causes the extruded material to be curved in a first output direction, while providing material in the second direction causes the extruded material to be curved in a second output direction which is orthogonal to the first output direction. The improved control arises from the material being provided in the first direction having a negligible effect on the curvature of the material in the second output direction, and the material being provided in the second direction having a negligible effect on the curvature of the material in the first output direction. Accordingly, the first and second directions may be substantially orthogonal such that providing material in the first direction causes the extruded material to be curved in a first output direction which is parallel to the first direction while having a negligible effect on the curvature of the extruded material in a second output direction which is perpendicular to the first output direction, while providing material in the second direction causes the extruded material to be curved in the second output direction while having a negligible effect on the curvature of the material in the first output direction.

This means that the two directions in which the extruded material is curved can be controlled independently—providing material in the first direction controls the curvature in the first output direction only, while providing material in the second direction controls the curvature in the second output direction only (with the first and second output directions being perpendicular).

The first, second and third directions may be substantially orthogonal. This gives rise to an extruded profile with improved mechanical properties from the increased SPD that occurs as a result of increasing the angle between the directions. This arrangement also allows the two curvature directions of the extruded material to be controlled independently.

The extrusion die may further be arranged to receive material to be extruded from an additional direction (referred to herein as a fourth direction, such that material is received from the first, second and fourth directions, and extruded in the third direction). The fourth direction may be substantially opposed to the first direction. That is, if providing the material in the first direction results in the extruded material being curved in a first output direction, then providing the material in a fourth direction which is substantially opposed to the first direction results in the extruded material being curved in a direction opposite to the first output direction.

When the first and second directions (and optionally the third direction) are substantially orthogonal, the fourth direction may be substantially opposite to the first direction. This means that providing material from the first direction results in the extruded material being curved in a first output direction while having a negligible effect on the curvature in a second output direction which is perpendicular to the first output direction; providing material from the second direction results in the extruded material being curved in the second output direction while having a negligible effect on the curvature in the first output direction; and providing material from the fourth direction results in the extruded material being curved in an output direction which is opposite to the first output direction (and is consequently also perpendicular to the second output direction), while having a negligible effect on the curvature in the second output direction.

This means that the curvature of the extruded material in the plane of the first output direction and the third direction can be controlled by providing material from the first direction and/or the fourth direction. This is because providing material from the first direction causes the extruded material to be curved in the opposite direction to when material is provided from the fourth direction. This means that, in the plane of the first output direction and the third direction, the extruded material can be curved in a positive or negative direction along an axis which is parallel to the first output direction. For example, assuming that the first direction is aligned with a notional x-axis and the fourth direction is also aligned with the notional x-axis, but opposing the first direction, providing material from the first direction may cause the extruded material to be curved towards the positive x-axis while providing material from the fourth direction may cause the extruded material to be curved towards the negative x-axis.

Providing the material from the fourth direction therefore provides improved control over the curvature of the extruded material in the first output direction (and in the plane of the first output direction and the third direction). Providing the material from the fourth direction also provides additional flexibility to the extrusion process, because the extruded material can be curved in a positive or negative direction along one axis.

The extrusion die may further be arranged to receive material to be extruded from a further direction (referred to herein as a fifth direction, such that material is received from the first, second, fourth and fifth directions, and extruded in the third direction). The fifth direction may be substantially opposed to the second direction. That is, if providing the material in the second direction results in the extruded material being curved in a second output direction, then providing the material in the fifth direction which is substantially opposed to the second direction results in the extruded material being curved in a direction opposite to the second output direction.

When the first and second directions (and optionally the third direction) are substantially orthogonal, the fifth direction may be substantially opposite to the second direction. This means that providing material from the first and/or fourth directions results in the extruded material being curved in a first output direction (or a direction opposite to the first output direction) while having a negligible effect on the curvature in a second output direction which is perpendicular to the first output direction; providing material from the second direction results in the extruded material being curved in the second output direction while having a negligible effect on the curvature in the first output direction; and providing material from the fifth direction results in the extruded material being curved in an output direction which is opposite to the second output direction (and is consequently also perpendicular to the first output direction), while having a negligible effect on the curvature in the first output direction.

This means that the curvature of the extruded material in the plane of the second output direction and the third direction can be controlled by providing material from the second direction and/or the fifth direction. This is because providing material from the second direction causes the extruded material to be curved in the opposite direction to when material is provided from the fifth direction. This means that, in the plane of the second output direction and the third direction, the extruded material can be curved in a positive or negative direction along an axis which is parallel to the second output direction. For example, assuming that the second direction is aligned with a notional z-axis and the fifth direction is also aligned with the notional z-axis, but opposing the second direction, providing material from the second direction may cause the extruded material to be curved towards the positive z-axis while providing material from the fifth direction may cause the extruded material to be curved towards the negative z-axis.

Providing the material from the fifth direction therefore provides improved control over the curvature of the extruded material in the second output direction (and in the plane of the second output direction and the third direction). Therefore, providing the material from the first, second, fourth and fifth directions gives an additional level of control over the directions in which the extruded material is curved. Providing the material from the fifth direction also provides additional flexibility to the extrusion process, because the extruded material can be curved in a positive or negative direction along two axes.

The extrusion die may be arranged to receive material from the first direction and from the second direction (and, if present, from the additional direction(s)) at different speeds. The extrusion die may be arranged to receive a first portion of material at a first speed and a second portion of material at a second speed. That is, a portion of material may be received in each direction and the extrusion die may be arranged to receive each portion of material at a different speed. The speed at which material is received in the first direction may be varied as the material is extruded from the orifice. Varying the speed at which material is received in the first direction allows the curvature of the extruded material in the first output direction to be varied during extrusion. This results in a profile with varying curvature in the first output direction.

Likewise, the speed at which material is received in the other directions may also be varied as the material is extruded from the orifice, thereby allowing improved control over the curvature of the extruded material.

The extrusion die may be arranged to receive material from the first direction via an opening with a first cross-sectional area and to receive material from the second direction via an opening with a second cross-sectional area, wherein the second cross-sectional area is different to the first cross-sectional area. The difference in cross-sectional areas results in different curvatures in the different output directions, for a given speed at which the material is provided. Accordingly, material may be provided at the same speed in the first and second directions, but the resulting extruded material may have increased curvature in one output direction compared to the other. The extrusion die may further be arranged to receive material from each other direction via a respective opening with a cross-sectional area. The cross-sectional area of an opening may differ from the cross-sectional areas of the other openings.

The apparatus may further comprise a plurality of compression elements, wherein, for each direction from which the extrusion die is arranged to receive material to be extruded, one of the plurality of compression elements is arranged to apply a force in that direction to the material to be extruded. For example, a first compression element may be arranged to apply a force to the material in the first direction, and a second compression element may be arranged to apply a force to the material in the second direction. Each compression element may be arranged to move simultaneously. Each compression element may be arranged to move at different speeds.

The apparatus may further comprise a controller configured to provide directions for controlling the movement of at least one of the plurality of compression elements. The controller may be configured to control each compression element such that each compression element moves independently. The controller may be configured to direct at least two of the plurality of compression elements to move simultaneously. The controller may be configured to direct at least two of the plurality of the compression elements to move at different speeds. The controller may be configured to vary the speed of at least one of the plurality of compression elements as the material is extruded.

The apparatus may further comprise a plurality of chambers, wherein, for each direction from which the extrusion die is arranged to receive material to be extruded, a portion of the material to be extruded is housed in one of the plurality of chambers. For example, a first chamber may be configured to house a first portion of the material and a second chamber may be configured to house a second portion of the material. Each chamber may be in communication with the extrusion die via a respective opening. Each portion of the material may be provided from the respective direction through the respective opening. For example, the first portion of the material may be provided from the first direction through the first opening and the second portion of the material may be provided from the second direction through the second opening.

At least one of the plurality of compression elements may be arranged to apply a force to the portion of the material housed within a respective one of the plurality of chambers. At least one of the plurality of chambers may be aligned with a respective one of the directions from which the material is provided. For example, a first chamber may be aligned with the first direction and a second chamber may be aligned with the second direction. At least one of the plurality of compression elements may be arranged to communicate with the interior of a respective one of the plurality of chambers.

The apparatus may further comprise a plurality of compression element noses. At least one of the plurality of compression element noses may be arranged to interface with a respective one of the plurality of compression elements and a respective portion of the material to be extruded. At least one of the plurality of compression element noses may be slidably received within a respective one of the plurality of chambers. At least one of the plurality of compression element noses may interface with the respective portion of the material to be extruded in the respective one of the plurality of chambers. That is, a force may be applied to the respective portion of the material to be extruded via a respective one of the plurality of compression element noses.

At least one portion of the material may be in the form of a billet. Each billet may be loaded into the respective chamber prior to the application of force to the billet by the respective compression element. Each billet may be heated prior to loading into the respective chamber.

According to another aspect of the present disclosure, there is provided a method of extruding a material, the method comprising providing material to be extruded to an extrusion die from a first direction, providing material to be extruded to the extrusion die from a second direction, and extruding the material in a third direction from an orifice in the extrusion die; wherein the first, second and third directions are not all in the same plane and wherein none of the first, second and third directions is parallel to any other of those directions.

The first and second directions may be substantially orthogonal. The first, second and third directions may be substantially orthogonal.

The method may further comprise providing material to be extruded to the extrusion die from a fourth direction, wherein the fourth direction is substantially opposed to the first direction. The method may further comprise providing material to be extruded to the extrusion die from a fifth direction, wherein the fifth direction is substantially opposed to the second direction.

For each direction from which material to be extruded is provided to the extrusion die, providing the material to be extruded to the extrusion die from that direction may comprise applying, to the material to be extruded, a force in that direction from a compression element of a plurality of compression elements.

The method may further comprise controlling the movement of at least one of the plurality of compression elements. Controlling the movement of at least one of the plurality of compression elements may comprise directing at least two of the plurality of compression elements to move simultaneously. Controlling the movement of at least one of the plurality of compression elements may comprise varying the speed of at least one of the plurality of compression elements as the material is extruded.

For each direction from which material to be extruded is provided to the extrusion die, providing the material to be extruded to the extrusion die from that direction may comprise housing a portion of the material to be extruded in one of a plurality of chambers.

According to a further aspect of an example of the present disclosure, there is provided a computer-readable medium comprising instructions which, when executed by a computer, cause the computer to carry out a method as described in the above paragraphs.

BRIEF DESCRIPTION OF FIGURES

Specific embodiments are described below by way of example only and with reference to the accompanying drawings, in which.

DETAILED DESCRIPTION

Embodiments of the present disclosure are explained below with particular reference to extrusion of metal profiles. It will be appreciated, however, that the apparatuses and methods described herein are also suitable for extruding profiles of other materials, such as plastics, polymers, ceramics, granular materials or other non-metals.

Figure 1:
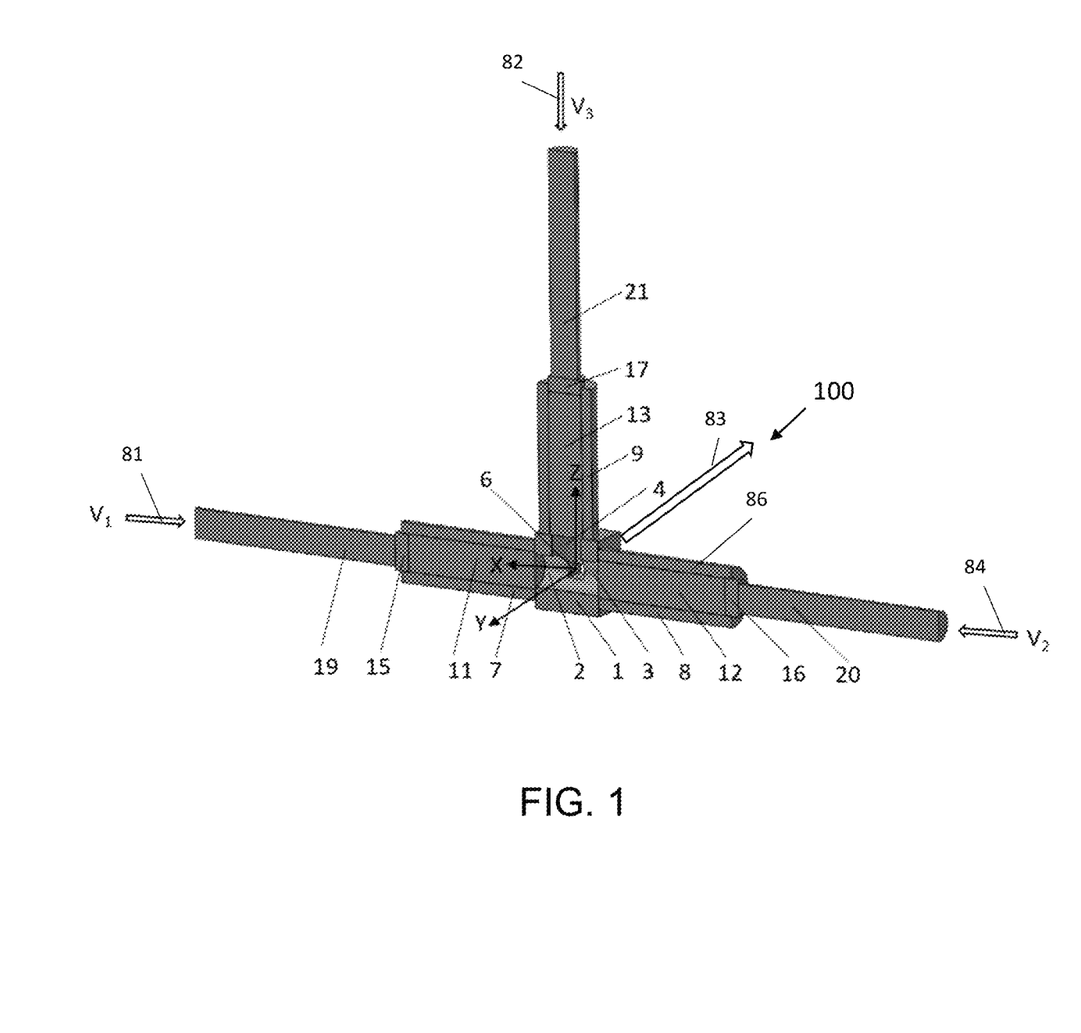
FIG. 1 is a cross-sectional perspective view of apparatus having three chambers.

Apparatus 100 for extruding a material is shown in FIG. 1. The apparatus 100 comprises an extrusion die 1. The extrusion die 1 comprises a first opening 2, a second opening 3 and a third opening 4. The extrusion die 1 also comprises an orifice 6, from which, in operation, material is extruded. As shown in FIG. 1, the material is extruded from the orifice 6 in the negative y-direction.

The apparatus 100 further comprises three chambers 86 in the form of a first billet container 7, a second billet container 8 and a third billet container 9. The first billet container 7 is in communication with the extrusion die 1 via the first opening 2. The second billet container 8 is in communication with the extrusion die 1 via the second opening 3. The third billet container 9 is in communication with the extrusion die 1 via the third opening 4.

The extrusion die 1 is arranged to receive material to be extruded in the form of a first billet 11, a second billet 12 and a third billet 13.

The first billet 11 is housed in the first billet container 7. The extrusion die 1 is arranged to receive the first billet 11 via the first opening 2. As shown in FIG. 1, the extrusion die 1 is arranged to receive the first billet 11 from a first direction 81 (i.e., the positive x-direction).

The second billet 12 is housed in the second billet container 8. The extrusion die 1 is arranged to receive the second billet 12 via the second opening 3. As shown in FIG. 1, the extrusion die 1 is arranged to receive the second billet 12 from the negative x-direction.

The third billet 13 is housed in the third billet container 9. The extrusion die 1 is arranged to receive the third billet 13 via the third opening 4. As shown in FIG. 1, the extrusion die 1 is arranged to receive the third billet 13 from a second direction 82 (i.e., the positive z-direction). The material is extruded from the orifice 6 in a third direction 83 (i.e. the negative y-direction, as explained above). The extrusion die 1 is arranged to receive the second billet 12 from a fourth direction 84 (i.e., the negative x-direction, as explained above).

The x-direction, y-direction and z-direction in FIG. 1 are orthogonal.

The apparatus 100 further comprises three compression element noses in the form of a first punch nose 15, a second punch nose 16 and a third punch nose 17. The first punch nose 15 is matched with the first billet 11 and the first billet container 7. The first punch nose 15 is slidably received within the first billet container 7. The second punch nose 16 is matched with the second billet 12 and the second billet container 8. The second punch nose 16 is slidably received within the second billet container 8. The third punch nose 17 is matched with the third billet 13 and the third billet container 9. The third punch nose 17 is slidably received within the third billet container 9.

The apparatus 100 further comprises three compression elements in the form of a first punch 19, a second punch 20 and a third punch 21. The first punch 19 is located behind the first punch nose 15 when viewed from the extrusion die 1 through the first opening 2. The second punch 20 is located behind the second punch nose 16 when viewed from the extrusion die 1 through the second opening 3. The third punch 21 is located behind the third punch nose 17 when viewed from the extrusion die 1 through the third opening 4.

Figure 2:
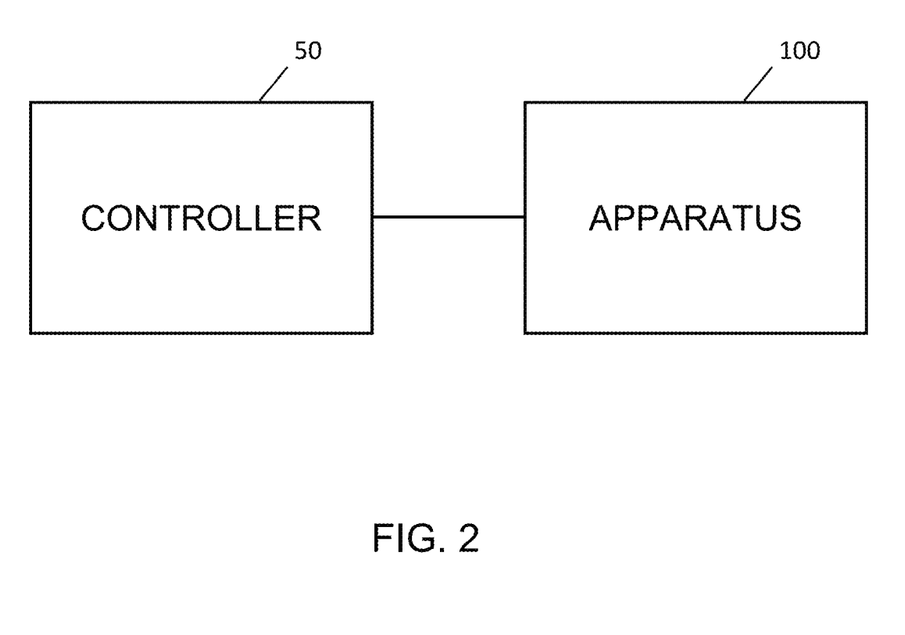
FIG. 2 is a schematic diagram showing a controller of the apparatus shown in FIG. 1.

As shown in FIG. 2, the apparatus 100 further comprises a controller 50. The controller 50 is configured to provide directions for controlling the movement of the first punch 19, the second punch 20 and the third punch 21. The controller 50 controls the movement of each of the punches using actuators (not shown). The controller 50 is configured to direct, in operation, the first punch 19, the second punch 20 and the third punch 21 to move simultaneously. The controller 50 is also configured to, in operation, vary the speed of the first punch 19, the second punch 20 and the third punch 21.

In operation, a force is applied simultaneously to the first 15, second 16 and third 17 punch noses via, respectively, the first 19, second 20 and third 21 punches. In FIG. 1, the velocity of the first punch nose 15 is denoted $v_1$, the velocity of the second punch nose 16 is denoted $v_2$ and the velocity of the third punch nose 17 is denoted $v_3$. A force is applied to the first punch nose 15 in the negative x-direction. A force is applied to the second punch node 16 in the positive x-direction. A force is applied to the third punch node 17 in the negative z-direction.

As the force is applied to the first 19, second 20 and third 21 punches, the first 11, second 12 and third 13 billets are forced into the extrusion die 1 via, respectively, the first 2, second 3 and third 4 openings. The first billet 11 is forced into the extrusion die 1 from the positive x-direction via the first opening 2. The second billet 12 is forced into the extrusion die 1 from the negative x-direction via the second opening 3. The third billet 13 is forced into the extrusion die 1 from the positive z-direction via the third opening 4. The material is then forced out of the orifice 6 in the extrusion die 1 in the negative y-direction.

By changing the rate of mass flow provided by the first 15, second 16 and third 17 punch noses, a three-dimensional curved profile can be produced. That is, the extruded material (i.e. the extrudate) which is forced out of the orifice 6 in the negative y-direction can be curved in the x-direction and in the z-direction.

Figure 3:
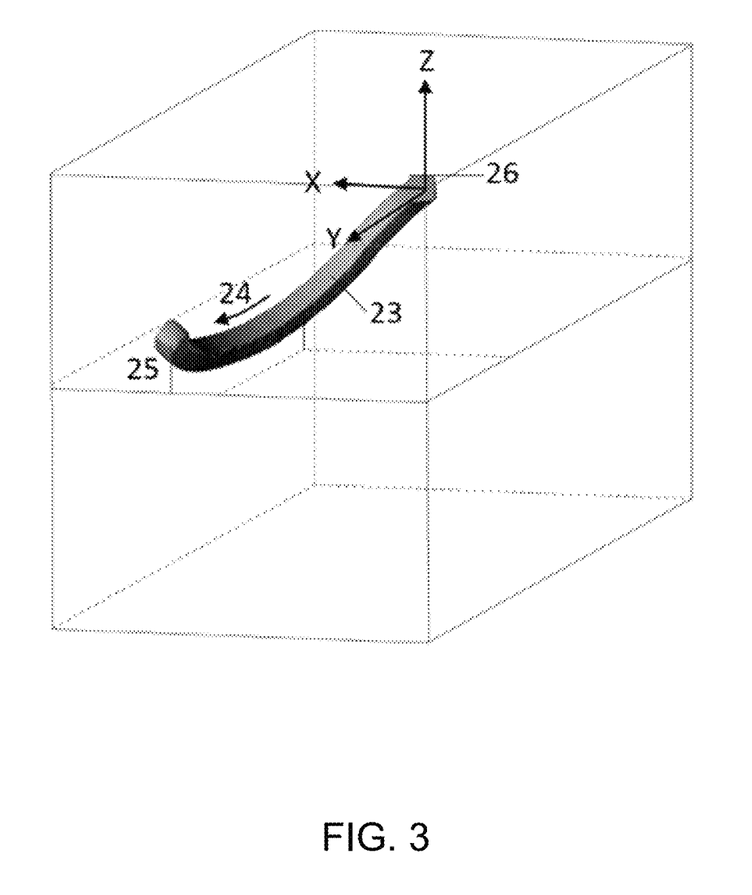
FIG. 3 is a perspective view of a first part of a first curved profile extruded using the apparatus of FIG. 1.

A first part of a first curved extruded profile 23, extruded using the apparatus 100 of FIG. 1, is shown in FIG. 3. To produce the first extruded profile 23, the first 19, second 20 and third 21 punches are moved towards the extrusion die 1. The extrudate is extruded in the flow direction 24 indicated by the arrow in FIG. 3.

The velocity $v_1$ of the first punch nose 15 is controlled to be less than the velocity $v_2$ of the second punch nose 16. This produces a flow velocity gradient across the orifice 6 of the extrusion die 1, resulting in curvature of the extrudate in the positive x-direction. At the same time, the third punch nose 17 is moved in the negative z-direction with velocity $v_3$. The velocity $v_3$ of the third punch nose 17 in the negative z-direction results in curvature of the extrudate in the negative z-direction.

The joint effect of the velocities $v_1$ and $v_2$ in the positive and negative x-directions and $v_3$ along the negative z-direction result in the first extruded profile 23 having a three-dimensional curved shape from point 25 to point 26.

Figure 4:
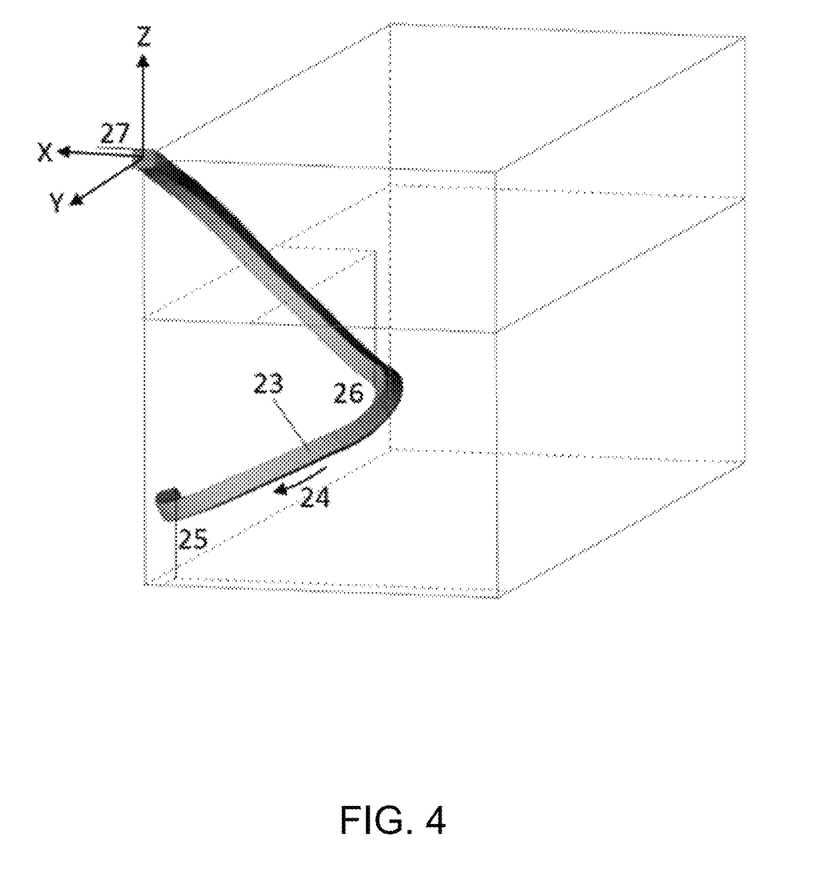
FIG. 4 is a perspective view of the first curved profile extruded using the apparatus of FIG. 1, including the first part shown in FIG. 3.

A second part of the first curved extruded profile 23, extruded using the apparatus 100 of FIG. 1, is shown in FIG. 4 in combination with the first part. From point 26 to point 27, the velocity $v_1$ of the first punch nose 15 is increased so that it is larger than the velocity $v_2$ of the second punch nose 16. This difference in velocity results in the first extruded profile 23 being curved in the negative x-direction.

From point 26 to point 27, the velocity $v_3$ of the third punch nose 17 is maintained. The joint effect of the velocities $v_1$ and $v_2$ in the positive and negative x-directions and $v_3$ along the negative z-direction result in the first extruded profile 23 having, from point 26 to point 27, a different three-dimensional curved shape to the three-dimensional curved shape from point 25 to point 26.

Figure 5:
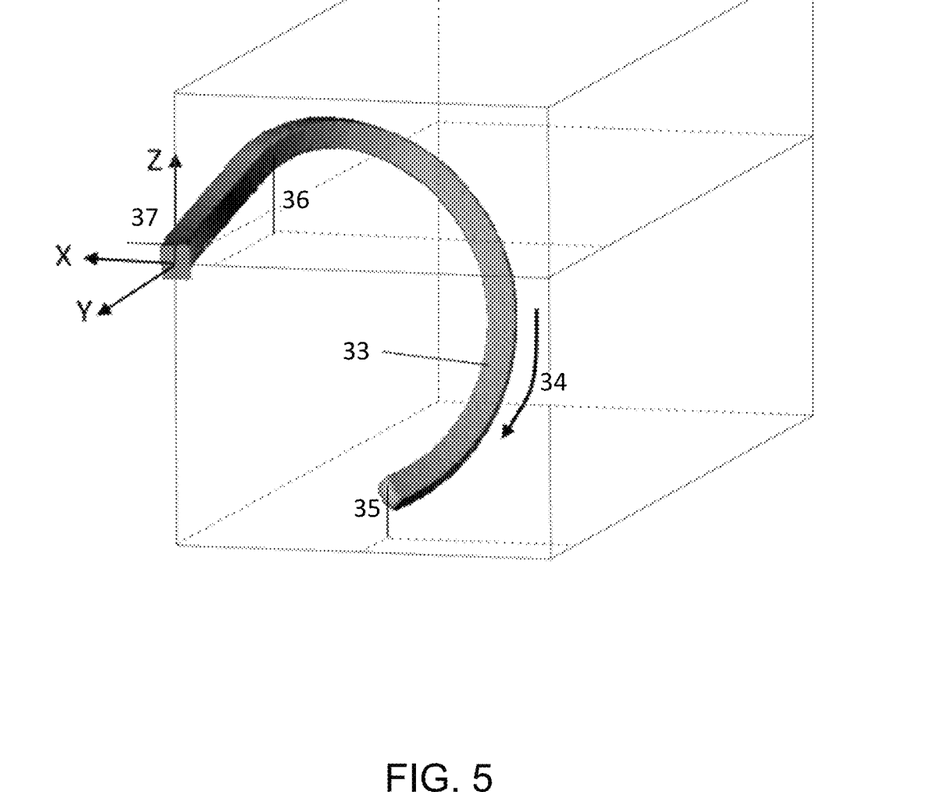
FIG. 5 is a perspective view of a second curved profile extruded using the apparatus of FIG. 1.

A second curved extruded profile 33, extruded using the apparatus 100 of FIG. 1, is shown in FIG. 5. The extrudate is extruded in the flow direction 34 indicated by the arrow in FIG. 5. To produce the second extruded profile 33, the velocity $v_1$ of the first punch nose 15 is larger than the velocity $v_2$ of the second punch nose 16. This produces a flow velocity gradient across the orifice 6 of the extrusion die 1, resulting in curvature of the extrudate in the negative x-direction.

At the same time, the third punch nose 17 is moved in the negative z-direction with velocity $v_3$. The velocity $v_3$ of the third punch nose 17 in the negative z-direction results in curvature of the extrudate in the negative z-direction.

The joint effect of the velocities $v_1$ and $v_2$ in the positive and negative x-directions and $v_3$ along the negative z-direction result in the second extruded profile 33 having a three-dimensional curved shape from point 35 to point 36.

From point 36 to point 37, the ratio of $v_1$ to $v_2$ (i.e. $v_1/v_2$) is reduced, meaning that the difference between $v_1$ and $v_2$ is less than the velocity difference when the material is extruded from point 35 to point 36. This means that the second extruded profile 33 is still curved in the negative x-direction, but with an increased curvature radius.

At the same time, the direction of velocity $v_3$ is reversed, meaning that the third punch nose 17 is moved backwards (i.e. in the positive z-direction). The third punch nose 17 is moved with a velocity $v_3$ which is less than $v_1$ and $v_2$. The reversal of the direction of velocity $v_3$ results in the extrudate being curved in the positive z-direction.

The joint effect of the velocities $v_1$ and $v_2$ in the positive and negative x-directions and $v_3$ in the positive z-direction result in the second extruded profile 33 having, from point 36 to point 37, a different three-dimensional curved shape to the three-dimensional curved shape from point 35 to point 36.

Figure 6:
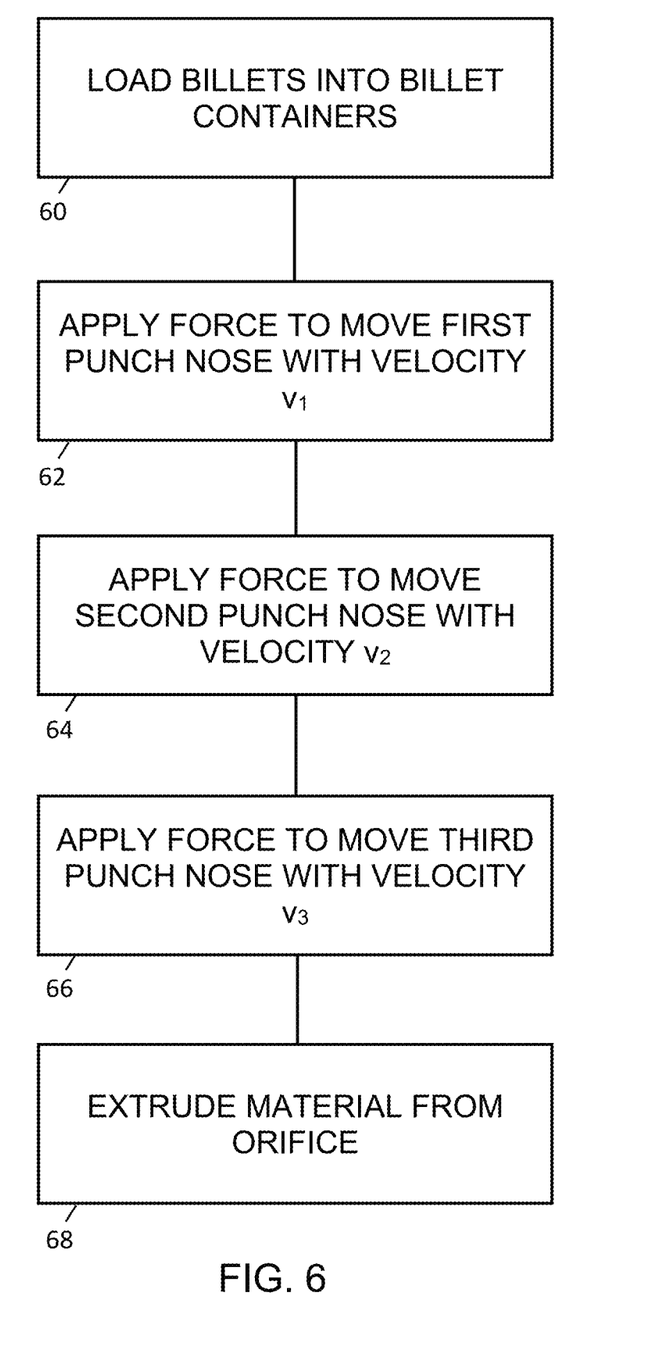
FIG. 6 is a flow diagram of a method of extruding a material using the apparatus of FIG. 1.

A flow diagram of a method of extruding a material using the apparatus 100 of FIG. 1 is shown in FIG. 6. At block 60, the first 11, second 12 and third 13 billets are loaded into the first 7, second 8 and third 9 billet containers, respectively. At block 62, a force is applied to move the first punch nose 15 with a velocity $v_1$ so that the first billet 11 is forced into the extrusion die 1. At block 64, a force is applied to move the second punch nose 16 with a velocity $v_2$ which is different to the velocity $v_1$ so that the second billet 12 is forced into the extrusion die 1. At block 66, a force is applied to move the third punch nose 17 with a velocity $v_3$ so that the third billet 13 is forced into the extrusion die 1. At block 68, material is extruded from the orifice 6 of the extrusion die 1.

Figure 7:
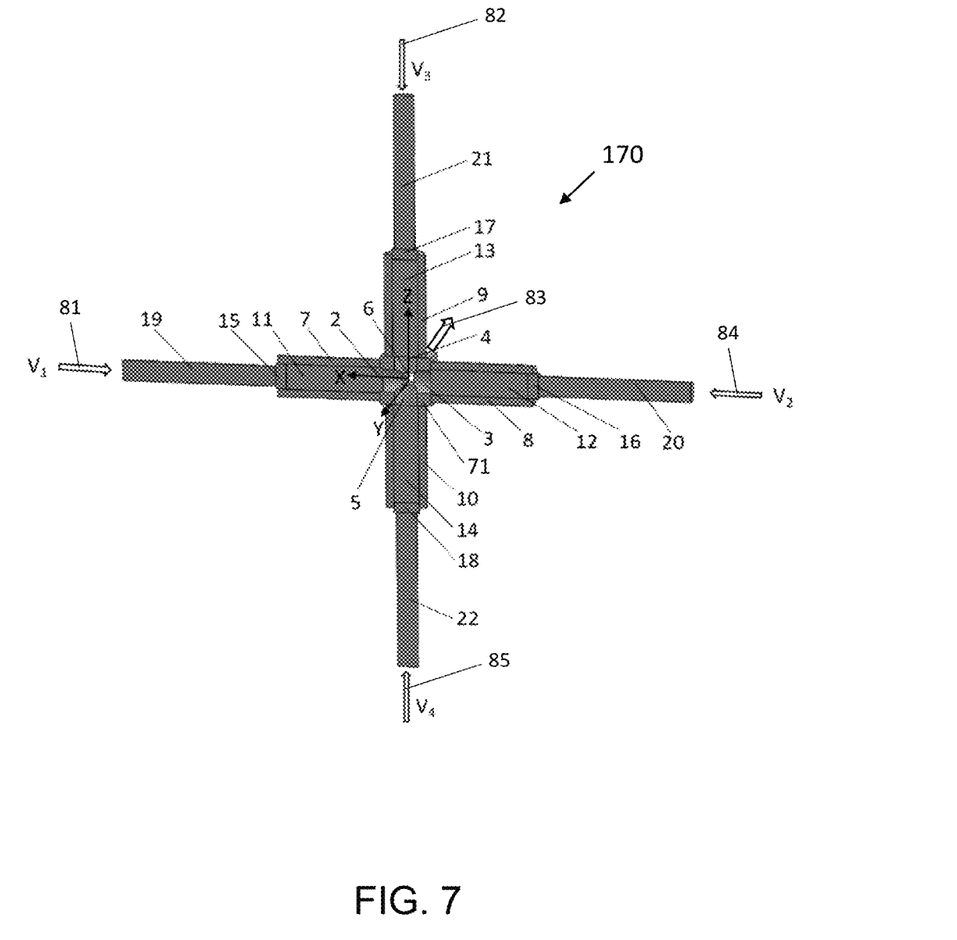
FIG. 7 is a cross-sectional perspective view of apparatus having four chambers.

A variant on the apparatus 100 shown in FIG. 1 is shown in FIG. 7. The apparatus 170 in FIG. 7 includes all of the features of the apparatus 100 of FIG. 1.

In addition, the extrusion die 71 of the apparatus 170 of FIG. 7 comprises a fourth opening 5. The apparatus 170 of FIG. 7 also comprises an additional chamber in the form of a fourth billet container 10. The fourth billet container 10 is in communication with the extrusion die 71 via the fourth opening 5. The extrusion die 71 is further arranged to receive material to be extruded in the form of a fourth billet 14.

The fourth billet 14 is housed in the fourth billet container 10. The extrusion die 71 is further arranged to receive the fourth billet 14 via the fourth opening 5. As shown in FIG. 7, the extrusion die 71 is arranged to receive the fourth billet 14 from a fifth direction 85 (i.e., the negative z-direction).

The apparatus 170 of FIG. 7 further comprises an additional compression element nose in the form of a fourth punch nose 18. The fourth punch nose 18 is matched with the fourth billet 14 and the fourth billet container 10. The fourth punch nose 18 is slidably received within the fourth billet container 10.

The apparatus 170 of FIG. 7 further comprises an additional compression element in the form of a fourth punch 22. The fourth punch 22 is located behind the fourth punch nose 18 when viewed from the extrusion die 71 through the fourth opening 5. The controller 50 (shown in FIG. 2) is configured to provide directions for controlling the movement of the fourth punch 22 of the apparatus 170 in FIG. 7. The controller 50 is configured to direct, in operation, the first 19, second 20, third 21 and fourth 22 punches to move simultaneously. The controller 50 is also configured to, in operation, vary the speed of the fourth punch 22.

In operation, a force is applied simultaneously to the first 15, second 16, third 17 and fourth 18 punch noses via, respectively, the first 19, second 20, third 21 and fourth 22 punches. In FIG. 7, the velocity of the first punch nose 15 is denoted $v_1$, the velocity of the second punch nose 16 is denoted $v_2$, the velocity of the third punch nose 17 is denoted $v_3$ and the velocity of the fourth punch nose 18 is denoted $v_4$. A force is applied to the first punch nose 15 in the negative x-direction. A force is applied to the second punch nose 16 in the positive x-direction. A force is applied to the third punch nose 17 in the negative z-direction. A force is applied to the fourth punch nose 18 in the positive z-direction.

As the force is applied to the first 19, second 20, third 21 and fourth 22 punches, the first 11, second 12, third 13 and fourth 14 billets are forced into the extrusion die 71 via, respectively, the first 2, second 3, third 4 and fourth 5 openings. The first billet 11 is forced into the extrusion die 71 from the positive x-direction via the first opening 2. The second billet 12 is forced into the extrusion die 71 from the negative x-direction via the second opening 3. The third billet 13 is forced into the extrusion die 71 from the positive z-direction via the third opening 4. The fourth billet 14 is forced into the extrusion die 71 from the negative z-direction via the fourth opening 5. The material is then forced out of the orifice 6 in the extrusion die 1 in the negative y-direction.

By changing the rate of mass flow provided by the first 15, second 16, third 17 and fourth 18 punch noses, a three-dimensional curved profile can be produced. That is, the extruded material (i.e. the extrudate) which is forced out of the orifice 6 in the negative y-direction can be curved in the x-direction and in the z-direction.

The addition of the fourth punch nose 18 means that both the ratio of $v_1$ to $v_2$ and the ratio of $v_3$ to $v_4$ can be adjusted arbitrarily. This allows the curvature of the extruded material to be controlled in the x-direction and in the z-direction.

Figure 8:
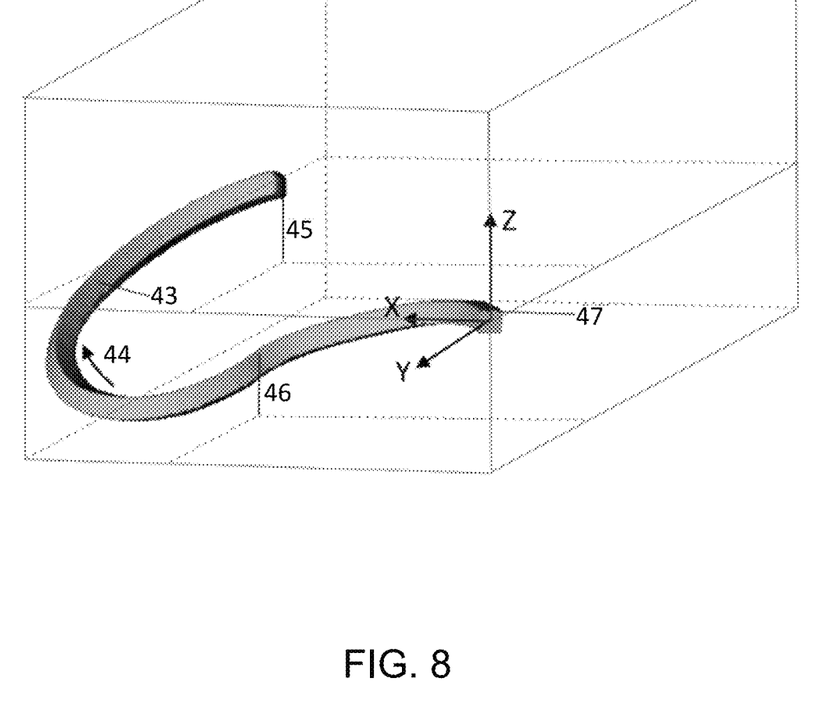
FIG. 8 is a perspective view of a third curved profile extruded using the apparatus of FIG. 7.

A third curved extruded profile 43, extruded using the apparatus 170 of FIG. 7, is shown in FIG. 8. To produce the third extruded profile 43, the first 19, second 20, third 21 and fourth 22 punches are moved towards the extrusion die 71. The extrudate is extruded in the flow direction 44 indicated by the arrow in FIG. 8.

From point 45 to point 46, the velocity $v_1$ of the first punch nose 15 is larger than the velocity $v_2$ of the second punch nose 16, and the velocity $v_3$ of the third punch nose 17 is less than the velocity $v_4$ of the fourth punch nose 18. This means that the third extruded profile 43 is curved simultaneously in the negative x-direction and in the positive z-direction. The third extruded profile therefore has a three-dimensional curved shape from point 45 to point 46.

From point 46 to point 47, the velocity $v_1$ of the first punch nose 15 is less than the velocity $v_2$ of the second punch nose 16, and the velocity $v_3$ of the third punch nose 17 is larger than the velocity $v_4$ of the fourth punch nose 18. This means that the third extruded profile 43 is curved simultaneously in the positive x-direction and in the negative z-direction. Therefore, the third extruded profile 43 has, from point 46 to point 47, a different three-dimensional curved shape to the three-dimensional curved shape from point 45 to point 46.

By adjusting the ratio of $v_1$ to $v_2$ and $v_3$ to $v_4$, the curvature of the three-dimensional extruded profile can be changed flexibly and controlled precisely.

Modifications to the apparatus 100 of FIG. 1 are now described. These modifications are also applicable to the apparatus 170 of FIG. 7.

A three-dimensional curved profile may be produced using the apparatus 100 of FIG. 1 or the apparatus 170 of FIG. 7 by using instructions stored on a computer-readable medium. The computer-readable medium may be executed on a computing device comprising a memory in which the instructions are stored, and a processor. The processor is configured to execute the instructions to produce the three-dimensional curved profile. For example, the computing device may be the controller 50 of FIG. 2. The controller 50 may execute the instructions to control the movement of the first 15, second 16 and third 17 punches to produce an extruded profile.

Although the extrusion die 1 of the apparatus 100 in FIG. 1 is shown as being arranged to receive material to be extruded from three directions (i.e. the positive x-direction, the negative x-direction, and the positive z-direction), a three-dimensional curved profile may still be produced if the apparatus is arranged to receive material from two directions. In this case, the apparatus may not comprise, for example, the second opening 3, the second billet container 8, the second punch nose 16 or the second punch 20. Consequently, no second billet 12 is used in this example.

With reference to the arrangement of the apparatus shown in FIG. 1, if material is only received from the positive x-direction and from the positive z-direction, then the velocity $v_1$ in the negative x-direction causes the extruded material to be curved in the negative x-direction while the velocity $v_3$ in the negative z-direction causes the extruded material to be curved in the negative z-direction.

This means that an extruded profile is produced which is simultaneously curved in the negative x-direction and in the negative z-direction. Accordingly, a three-dimensional curved profile can be produced. Curvature in the positive x-direction and in the positive z-direction may be achieved by reversing the directions of the velocities $v_1$ and $v_3$, as described above in relation to the apparatus 100 of FIG. 1.

In addition, the directions from which the extrusion die is arranged to receive the material to be extruded do not need to be orthogonal with respect to one another. Also, each of the directions from which the extrusion die is arranged to receive the material to be extruded does not need to be orthogonal with the direction in which the material is extruded from the orifice.

Taking the coordinate system shown in FIG. 1, the extrusion die may be arranged to receive material to be extruded from a first direction which is represented by the three-dimensional velocity vector $\{x_1, y_1, z_1\}$ and from a second direction which is represented by the three-dimensional velocity vector $\{x_2, y_2, z_2\}$. The extrusion die may further be arranged to extrude material through the orifice. In this example, the orifice is aligned with a notional y-axis.

Providing the material from the first direction means that the extruded material is curved in the first direction. Likewise, providing the material from the second direction means that the extruded material is curved in the second direction. If $x_1$ in the velocity vector representing the first direction is non-zero, then providing the material in the first direction causes the extruded material to be curved in the x-direction. For example, if $x_1$ is negative, then the extruded material is curved in the negative x-direction.

Similarly, if $z_2$ in the velocity vector representing the second direction is non-zero, then providing the material in the second direction causes the extruded material to be curved in the z-direction. For example, if $z_2$ is negative, then the extruded material is curved in the negative z-direction.

In this example, the relative orientations of the two directions can be more easily understood by notionally representing the first direction with a velocity vector having a z-component which is zero. Therefore, in order to extrude material which is curved in the x-direction, the first direction has a non-zero x-component. The y-component of the velocity vector can be zero or non-zero. The velocity vector of the first direction can therefore be represented as $\{x_1 \neq 0, y_1, z_1 = 0\}$.

The second direction does not need to be orthogonal with the first direction. In order to extrude material which is curved in the z-direction, the second direction has a velocity vector with a non-zero z-component. The x-component and the y-component of the velocity vector can each be zero or non-zero. The velocity vector of the second direction can therefore be represented as $\{x_2, y_2 = 0, z_2 \neq 0\}$.

The non-zero x-component of the first direction results in the extruded material being curved in the x-direction. The non-zero z-component of the second direction results in the extruded material being curved in the z-direction. If the x-component of the second direction is non-zero, then this will either be cumulative with the x-component of the first direction or it will reduce the curvature caused by the x-component of the first direction, depending on the relative magnitudes and directions of the x-components of the two directions.

A three-dimensional extruded profile may also be produced by adjusting the cross-sectional area of the openings through which the material is received at the extrusion die. Adjusting the cross-sectional area changes the mass-flow rate of the material into the extrusion die, for a given punch velocity. The mass-flow rate may also be changed by adjusting the cross-sectional area of the openings and by adjusting the velocity of the punches.

Hot or cold billets may be placed in the chambers for hot or cold extrusion. To produce hollow extruded profiles, a mandrel may be placed in the extrusion die.

The above implementations have been described by way of example only, and the described implementations are to be considered in all respects only as illustrative and not restrictive. It will be appreciated that variations of the described implementations may be made without departing from the scope of the invention. It will also be apparent that there are many variations that have not been described, but that fall within the scope of the appended claims.

The invention claimed is:

1. An apparatus for extruding a material as a three-dimensional curved profile, the apparatus comprising:
   an extrusion die arranged to receive the material to be extruded from a first direction and from a second direction, the extrusion die comprising a non-circular orifice from which material is extruded in a third direction,
   wherein the extrusion die does not include a valve,
   wherein the first, second and third directions are not all in a same plane and wherein none of the first, second and third directions is parallel to any other of those directions, such that the material is extruded from the orifice as the three-dimensional curved profile having curvature in two orthogonal directions,
   wherein the curvature of the extruded material is in all three dimensions,
   wherein the first and second directions are substantially orthogonal,
   wherein providing the material from the first direction contributes to the curvature of the extruded material in one of the two orthogonal directions,
   wherein providing the material from the second direction contributes to the curvature of the extruded material in another one of the two orthogonal directions,
   a plurality of compression elements, wherein, for each direction from which the extrusion die is arranged to receive material to be extruded, one of the plurality of compression elements is arranged to apply a force in that direction to the material to be extruded; and
   a controller configured to provide directions for controlling a movement of the plurality of compression elements, wherein the controller is configured to:
   direct the plurality of compression elements to move simultaneously; and
   direct at least two of the plurality of the compression elements to move at different speeds.

2. The apparatus according to claim 1, wherein the first, second and third directions are substantially orthogonal.

3. The apparatus according to claim 1, wherein the extrusion die is arranged to receive material to be extruded from a fourth direction, wherein the fourth direction is substantially opposed to the first direction.

4. The apparatus according to claim 3, wherein the extrusion die is arranged to receive material to be extruded from a fifth direction, wherein the fifth direction is substantially opposed to the second direction.

5. The apparatus according to claim 1, wherein the controller is configured to vary a speed of at least one of the plurality of compression elements as the material is extruded.

6. The apparatus according to claim 1, the apparatus further comprising a plurality of chambers, wherein, for each direction from which the extrusion die is arranged to receive material to be extruded, a portion of the material to be extruded is housed in one of the plurality of chambers.

7. A method of extruding a material as a three-dimensional curved profile, the method comprising:
  providing the material to be extruded to an extrusion die from a first direction, wherein the extrusion die does not include a valve;
  providing the material to be extruded to the extrusion die from a second direction, wherein, for each direction from which material to be extruded is provided to the extrusion die, providing the material to be extruded to the extrusion die from that direction comprises applying, to the material to be extruded, a force in that direction from a compression element of a plurality of compression elements; and
  extruding the material in a third direction from a non-circular orifice in the extrusion die,
  wherein the first, second and third directions are not all in a same plane and wherein none of the first, second and third directions is parallel to any other of those directions, such that the material is extruded from the orifice as the three-dimensional curved profile having curvature in two orthogonal directions,
  wherein the curvature of the extruded material is in all three dimensions,
  wherein the first and second directions are substantially orthogonal,
  wherein providing the material from the first direction contributes to the curvature of the extruded material in one of the two orthogonal directions,
  wherein providing the material from the second direction contributes to the curvature of the extruded material in the other one of the two orthogonal directions,
  wherein the method further comprises controlling a movement of the plurality of compression elements, and
  wherein controlling the movement of the plurality of compression elements comprises:
    directing the plurality of compression elements to move simultaneously; and
    directing at least two of the plurality of the compression elements to move at different speeds.

8. The method according to claim 7, wherein the first, second and third directions are substantially orthogonal.

9. The method according to claim 7, further comprising:
  providing material to be extruded to the extrusion die from a fourth direction, wherein the fourth direction is substantially opposed to the first direction.

10. The method according to claim 9, further comprising: providing material to be extruded to the extrusion die from a fifth direction, wherein the fifth direction is substantially opposed to the second direction.

11. The method according to claim 7, wherein controlling the movement of at least one of the plurality of compression elements comprises varying a speed of at least one of the plurality of compression elements as the material is extruded.

12. The method according to claim 7, wherein for each direction from which material to be extruded is provided to the extrusion die, providing the material to be extruded to the extrusion die from that direction comprises housing a portion of the material to be extruded in one of a plurality of chambers.

13. A non-transitory computer-readable medium comprising executable instructions which, when executed by a computing device, cause the computing device to carry a method of extruding a material as a three-dimensional curved profile, the method comprising:
  providing the material to be extruded to an extrusion die from a first direction, wherein the extrusion die does not include a valve;
  providing the material to be extruded to the extrusion die from a second direction, wherein, for each direction from which material to be extruded is provided to the extrusion die, providing the material to be extruded to the extrusion die from that direction comprises applying, to the material to be extruded, a force in that direction from a compression element of a plurality of compression elements; and
  extruding the material in a third direction from a non-circular orifice in the extrusion die,
  wherein the first, second and third directions are not all in a same plane and wherein none of the first, second and third directions is parallel to any other of those directions, such that the material is extruded from the orifice as the three-dimensional curved profile having curvature in two orthogonal directions,
  wherein the curvature of the extruded material is in all three dimensions,
  wherein the first and second directions are substantially orthogonal,
  wherein providing the material from the first direction contributes to the curvature of the extruded material in one of the two orthogonal directions,
  wherein providing the material from the second direction contributes to the curvature of the extruded material in the other one of the two orthogonal directions,
  wherein the method further comprises controlling a movement of the plurality of compression elements, and
  wherein the controlling the movement of the plurality of compression elements comprises:
    directing the plurality of compression elements to move simultaneously; and
    directing at least two of the plurality of the compression elements to move at different speeds.

* * * * *